Feb. 1, 1966  R. G. HODGE, JR  3,232,531
CALCULATOR
Filed May 13, 1963  3 Sheets-Sheet 1
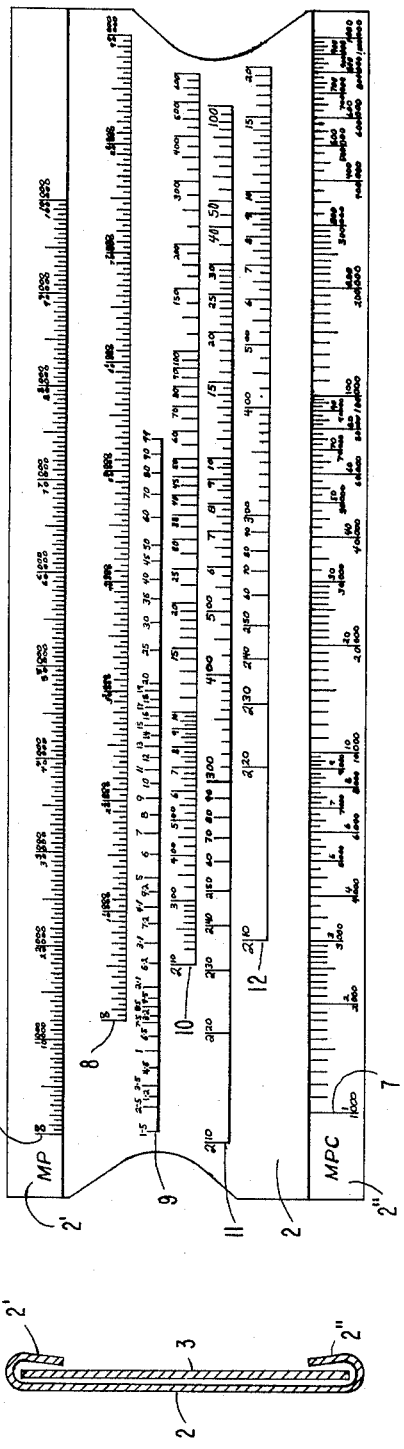
FIG. 1
FIG. 3
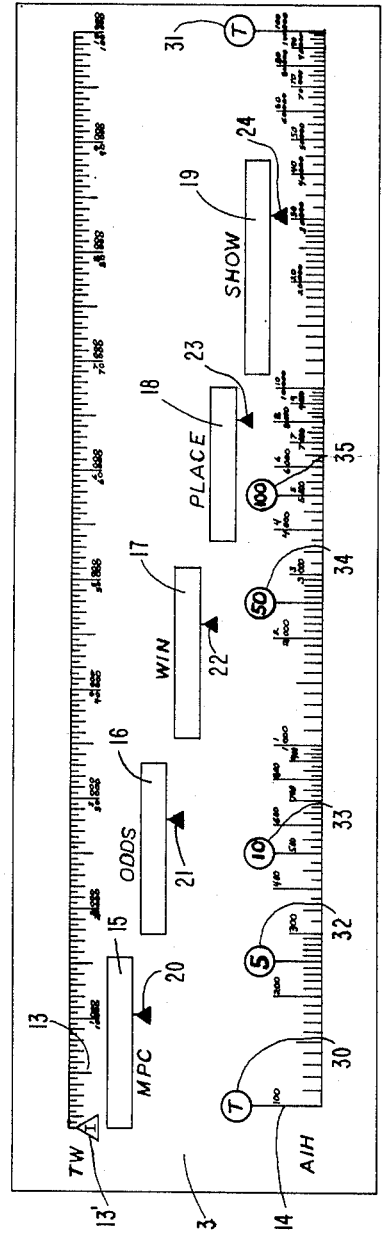
FIG. 2
INVENTOR
RICHARD G. HODGE JR.
BY
ATTORNEYS

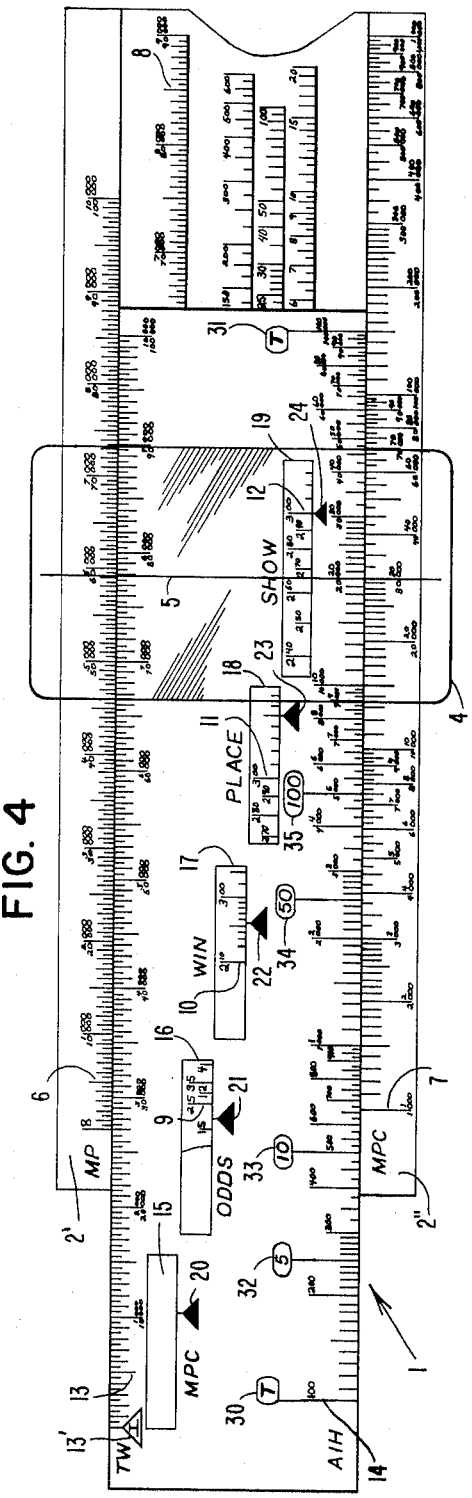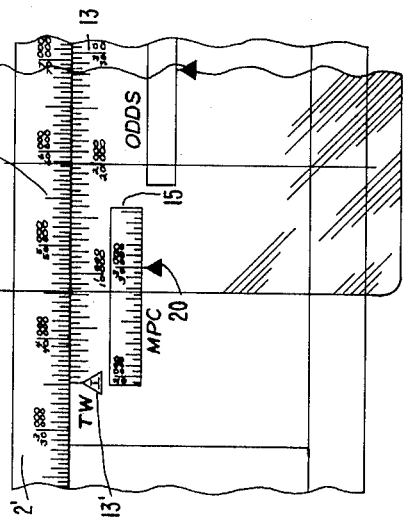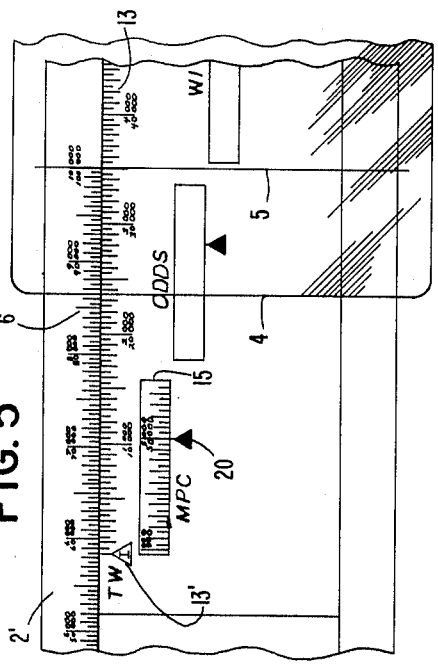

Feb. 1, 1966　　　R. G. HODGE, JR　　　3,232,531
CALCULATOR
Filed May 13, 1963　　　　　　　　　　　　　　3 Sheets-Sheet 3

INVENTOR
RICHARD G. HODGE JR.
BY
ATTORNEYS

United States Patent Office

3,232,531
Patented Feb. 1, 1966

3,232,531
CALCULATOR
Richard G. Hodge, Jr., Northampton Courts,
Amsterdam, N.Y.
Filed May 13, 1963, Ser. No. 279,740
1 Claim. (Cl. 235—70)

The present invention relates to a device for use in solving problems relating to the pari-mutuel system of wagering and more particularly to a mechanical computing device to be used in conjunction with various competitive sporting events, in which wagers are made, for determining the minimum amount that will be paid to win, place or show.

In the pari-mutuel system of wagering with respect to horse racing, for example, there are three winning positions called, win, place, and show which respectively designate the horse that finishes the race in the first, second or third position.

In the wagering on the win position, tickets corresponding to the different horses in the race are purchased at a specified price. The total amount of money wagered on the win position goes into what is called the mutual win pool. This, less a small percent, represents the net mutual win pool which is the amount of money available for payment to the holders of the tickets that properly designate the particular horse that finished first or in the win position. The small percentage not returned to the holders of the winning tickets represents the amount payable to the State and the amount payable to the management conducting the race. This amount not returned to the ticket holders is called the track take or mutual take and varies from State to State.

To determine the amount of money redeemable for each winning ticket, the net pool is divided by the amount wagered on the winning horse. This determines the pay-off per dollar, including profit and wager. Since most tracks operate on the two dollar ticket system, the foregoing amount is multiplied by two in calculating the total amount redeemable per ticket. Of course, for a ticket of any other purchase price, the amount of pay-off per dollar will have to be multiplied by such purchase price in calculating the total amount redeemable.

In wagering on the place position, the total amount of money wagered is called the mutual place pool and after the track take has been subtracted, it is called the net mutual place pool. The ticket holders entitled to share in this money are those who hold place tickets for horses that finished both first or second. To determine the money redeemable by each individual ticket holder, the amount wagered in this place pool on the horse that came in first and the amount wagered on the horse that came in second are deducted from the net mutual place pool. These two amounts will be returned respectively to the holders of place tickets on the horse that finished first and to the holders of place tickets on the horse that finished second. The amount remaining is divided in half, one part to be shared equally by the holders of the place tickets on the horse that finished first and the other part to be shared equally by the holders of the place tickets on the horse that finished second. In other words, to calculate the total amount redeemable per place ticket, the track take is first subtracted from the mutual place pool to determine the net place pool. Next, the amounts wagered on the horse finishing first and second are subtracted from this net place pool to determine the profit. This profit is then divided in half and the halves, in turn, divided respectively by the amounts wagered on the horse finishing first and second. This gives the profit per dollar, to which is added the wager.

In wagering on the show position there are three horses that will pay money to holders of show tickets. These are the horses that finished first, second, and third. To calculate the amount redeemable to each holder of a show ticket, the same procedure used with respect to the place position is followed except that an extra horse must be included in the calculation. In other words, the track take is first subtracted from the mutual show pool to determine the net show pool. Next, the amounts wagered on the horse finishing first, second, and third are deducted from this net show pool to determine the profit. This profit is divided into three equal parts, and each part, in turn, divided respectively by the amounts wagered on the horse finishing first, second, and third. This gives the profit per dollar to which is added the wager.

The main problem in the pari-mutuel system of wagering which gives rise to the present invention is the large number of possibilities of winning combinations and the large number of possibilities of different pari-mutuel pay-offs per winning ticket.

With respect to the win position in a twelve horse race, for example, there exists 12 potential winners. With respect to the place position, the number of potential winning or paying combinations is factorial 12 taken two at a time resulting in 132 combinations. Similarly, with the show position, the number of potential winning or paying positions is factorial 12 taken three at a time resulting in 1320 combinations. In view of this, the tote boards at present day tracks indicate only the odds on the entered horses to win. They do not show the odds to place or show. For the latter two positions, the tote boards merely indicate the total pool for that position and the total amount wagered on each horse in that pool.

Furthermore, with respect to the odds that are shown on the tote board, the amount wagered on a particular horse relative to the total amount of the win pool seldom comes out to an even figure. The tracks therefore round these figures off and merely give an odds value approximating the true value. Therefore, although the odds that are given on the tote board for any particular horse should indicate precisely the profit due the holder of a win ticket when multiplied by the value of such ticket, this does not, in fact, occur.

According to the teachings of the present invention there is provided a mechanical computing device in which the individual parts cooperate in a novel manner with the various scales thereon so that one may calculate precisely the minimum amount any horse will pay to win, place or show according to the amount shown on the tote board as wagered at the moment the calculation is being made. Furthermore, with respect to the win position, the computing device may be used to calculate exactly the amount redeemable for any particular horse if that horse should win.

The computing device of the present invention is most advantageously employed during the wagering period before the race is begun for interpreting the information given on the tote board and for using such information to determine precisely the minimum amount any particular horse would pay to win, place or show if the values given on the tote board were not subsequently changd. Of course, these values do change as the betting continues, but for the purposes for which the calculator is to be used, this does not detract from the value of the calculator. In addition, the calculator of the present invention may be used anytime after the race has actually begun to determine exactly what the winning horses will pay.

A fuller understanding of the present invention will be obtained from a careful reading of the following detailed description and examination of the accompanying drawings of which:

FIG. 1 is a plan view of the base member of one form of the calculator of the present invention;

FIG. 2 is a plan view of the slide member of the calculator;

FIG. 3 is a cross-sectional view on reduced scale of the calculator shown in FIGS. 1 and 2 with the parts assembled;

FIG. 4 is a plan view of the calculator shown in FIGS. 1 and 2 with the parts assembled;

FIG. 5 is a partial plan view of the calculator shown in FIGS. 1 and 2 with the slide member in a specific position;

FIG. 6 is another partial plan view of the calculator shown in FIGS. 1 and 2 with the slide member in a different position;

Figure 7:
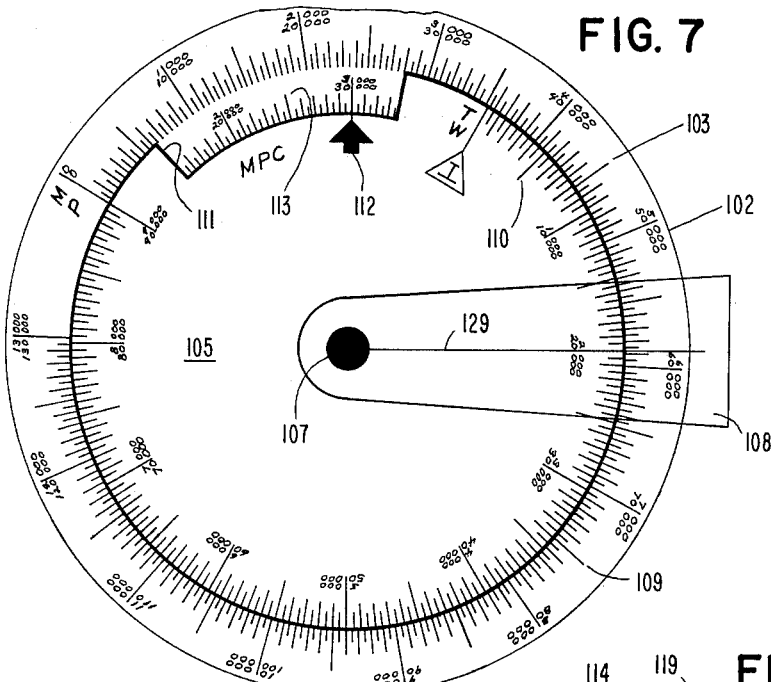
FIG. 7 is a plan view of a modified form of the invention.

In the form of the invention shown in FIGS. 1–6, the calculator, generally designated as 1, comprises a base member 2, cooperating slide member 3 and slidable cursor 4 having a hairline 5. As shown in FIG. 3, the base member is bent over along its longitudinal edges 2' and 2'' for slidably retaining the slide member 3. In addition, the base member is provided with a plurality of scales 6–12. Scales 6 and 7 are disposed on the bent over edges 2' and 2'', respectively, and scales 8–12 are disposed along the center portion of the base member between the edges 4 and 5. Scales 6 and 7 are working scales while scales 8–12 are answer scales, as will be more fully described below. The slide member 3 is, itself, provided with two scales 13 and 14 adjacent its longitudinal edges for cooperating with the working scales 6 and 7, respectively. Scales 13 and 14 are also designated as working scales. In addition to the scales 13 and 14, the slide member 3 is provided with answer windows 15–19 spaced apart and staggered from each other in the manner shown whereby each window overlies one of the scales 8–12. Markers 20–24 are provided on the slide member adjacent the windows for indicating specific values on each of the answer scales 8–12, respectively.

Scale 6 on the overturned edge 2' of the base member 2 is an arithmetic scale graduated over a suitable range such as 0–100,000. The values shown on this scale represent the mutual pool (MP) or gross amount of money wagered on all horses for either the win, place or show position and this scale is accordingly designated the MP scale. Scale 13 on the slide member 3 is adapted to cooperate with the MP scale 6 and the values shown thereon represent the total amount of money wagered on any particular horse. Accordingly, this scale has been designated as the TW (total wagers) scale. The TW scale is an arithmetic scale graduated from 0–100,000 and as shown, this scale is provided with a triangular index marker 13' at its left end. For facilitating the use of the MP and TW scales, the letter I for index is positioned inside the index marker 13'. Answer scale 8 is used for reading answers to calculations made on the MP and TW working scales and like the two working scales, scale 8 is an arithmetic scale. Answers on scale 8 are read through the cooperating answer window 15 and will be found directly above the marker 20. This window and scale are designated by the letters MPC (mutual pool correction) since the values read on this scale through the cooperating window represent the mutual pool after it has been corrected by subtracting the track take. More specifically, the calculator has been constructed for use where the track commission and taxes is 15% and in view of this, scales 6 and 8 have been reduced in size by 15% as compared with the graduations of scale 13. With this construction, calculations made on the MP and TW scales, 6 and 13 will show corrected answers on the MPC scale 8 that take into account the track commission and taxes of 15%.

The next two scales to be described are the working scales 7 and 14. As shown, both of these scales are logarithmic scales and, are divided into three equal parts. From the drawings it will be seen that the values shown on scale 14 are offset to the right or in a forward direction with respect to the corresponding values shown on scale 7. In other words, the first segment of scale 7 is laid out with the values 1–10 while these values on scale 14 are in the second segment. This relationship is also true with respect to the remaining values shown on these scales. The values on these scales could be run on indefinitely, however, it has been found sufficient to have the highest value shown on scale 7 as 1,000,000 and that on scale 14 as 100,000. The offsetting of these two scales is provided so that the answer scales 9–12, to be described presently, may be placed wholly within the borders of the base member and the windows 16–19 placed in a uniformly staggered or stepped relationship on the slide member and to prevent running off the end of the scales when making calculations.

Scale 7, as shown in the drawings, is designated as an MPC scale which, it will be noted, is the same designation given to scale 8. The reason for this is that the values calculated on the MPC arithmetic scale 8 are merely intermediate answers and must be transferred to a logarithmic scale so that subsequent divisions may be performed. The MPC logarithmic scale 7 serves this purpose.

Scale 14, as shown, has been designated the AIH scale. The designation AIH has been used as an aid to the operator of the calculator to point out by abbreviation that the values shown on this scale indicate the amount wagered on any individual horse. As stated before, the values shown on the AIH scale are offset with respect to those on the MPC logarithmic scale. Furthermore, the highest value indicated on this scale is 100,000 as compared with the highest value of 1,000,000 shown on the MPC logarithmic scale although higher values may be shown if desirable.

The answers to calculations made on the two working scales 7 and 14 will be found on one of the answer scales 10, 11, or 12 which are logarithmic scales. These scales are respectively designated as the win, place, and show answer scales and are to be used for calculating the amount redeemable on a $2 ticket. To read the values on these three scales, the corresponding windows 17, 18, and 19 and cooperating markers 22, 23, and 24 are used. Each of these scales begins at the value of $2.10 since this is the lowest amount a winning $2 ticket will pay, and the upper limit of these scales are chosen to include the normal ranges of betting; however, it is to be understood that the range of any of the scales may be changed to meet particular circumstances if necessary.

The last answer scale on the base member 2 is the odds scale 9. This scale is provided with values ranging from 1:5 to 99:1 which represent the odds any horse will pay to win.

Finally, it should be noted that either end of the AIH scale are ticket indicators 30 and 31 and between these index markers are four ticket markers 32, 33, 34, and 35. These ticket markers are used for determining the total amount redeemable for 5, 10, 50, and 100 dollar tickets since the answer scales 10, 11, and 12 are calibrated to give annswers only for $2 tickets.

A description of the operation of the calculator will now be given for a hypothetical set of facts wherein it is desired to determine the minimum amount a particular horse will pay to place.

For example, it will be assumed that in a particular race, the total mutual pool for the place position as shown on the tote board is $100,000 and the highest amount wagered on any horse is $35,000. It is also assumed that the horse under consideration has $20,000 wagered on it to place. With these figures known, the net place pool may be calculated. As indicated above, this is done by subtracting 15% from the gross place pool. In the present example, this would be $$\$100,000 - \$15,000 = \$85,000$$

The next two calculations required are the subtraction from this net place pool of the respective amounts of money wagered on the favorite horse and the horse being considered. The resulting figure will be the amount of profit or money available for distribution after the original investments on the two horses have been returned. In the present example this will be $$\$85,000 - \$35,000 - \$20,000 = \$30,000$$

To arrive at this answer of $30,000 on the calculator, the hairline 5 of the cursor 4 is set on the MP scale at the value of 100,000 as shown in FIG. 5. Next the slide member is moved to the position shown in FIG. 5 where the value of $35,000 on the TW scale is disposed directly in alignment with the $100,000 value on the MP scale. In this manner $35,000 may be subtracted from $100,000 while at the same time the 15% representing the track take will be subtracted from the original $100,000. As shown on the MPC arithmetic scale 8 directly above the marker 20 of the MPC window, the answer is $50,000.

In order to subtract the $20,000 which was wagered on the horse being considered, the cursor 4 is moved to the left until the hairline 5 overlies the index marker 13' on the TW scale and the slide member 3 is then moved until the value of 20,000 appears directly below the hairline as shown in FIG. 6. To read the answer, the MPC arithmetic scale is once again referred to and from FIG. 6 it will be noted that directly above the marker 20, the value of 30,000 appears in the window 15. This, as shown by the paper calculations given above, is the amount of money available for distribution as profit.

Knowing the amount of money available for distribution as profit, the specific part of it to be paid to each ticket holder may be found by performing a number of divisional calculations. For this purpose the remaining two working scales 7 and 14 are employed.

To perform these divisions on the value given on MPC arithmetic scale, such value is transferred to the MPC logarithmic scale 7. This value is then divided into two equal parts to determine the amount of money available for distribution respectively to the holders of the place tickets on the horse that finished first and to the holders of place tickets on the horse that finished second.

Next, this amount or one-half the amount of money available for distribution as profit must be divided by the amount of money wagered on the particular horse under consideration. After these two divisions have been made, the amount of the wager ($2.00) is added to give the total amount redeemable per $2.00 ticket.

To make these calculations on the calculator, scale 14 is used in conjunction with the MPC logarithmic scale 7; the answers calculated, however, are not read on either scales 7 or 14 but are found on the place answer scale 11 directly through the place answer window 18 above the cooperating marker 23. According to the teachings of the present invention, all three of these calculations, the two divisions and the one addition, are effected by one movement of the cooperating parts of the calculator.

As stated above, the values on the AIH scale 14 represent the amount wagered on the individual horses and accordingly to determine the total amount redeemable on the horse being considered, it is only necessary to move the slide member 3 along the base member 2 until the amount wagered on this horse as found on the AIH scale is directly in alignment with the amount available for distribution as profit as found on the MPC logarithmic scale 7.

In our example, the net amount available for distribution is $30,000 and the amount wagered on the horse being considered is $20,000. With the aid of the cursor 4, the parts of the calculator are accordingly set in the position shown in FIG. 4 with 20,000 on the AIH scale in line with 30,000 on the MPC logarithmic scale 7. By making this single setting the total amount redeemable to each holder of a place ticket on the horse under consideration may be read directly on the place answer scale 11 through the place window 18 of the slide member by reading the value shown directly above the place marker 23. As shown, answer is $3.50.

If the proper calculations are made individually, it will be noted that:

$$\frac{30,000}{(2)(20,000)} (2) + 2.00 = \$3.50$$

In the above example, the amount of money redeemable has been calculated for holders of place tickets; however, the calculations involved in determining the amount redeemable for the win or show positions are similar.

More specifically, with the win position, no subtraction need be made on the MP and TW scales. To calculate the amount a particular horse will pay to win, it is only necessary to find the value of the mutual win pool on the MPC logarithmic scale and to place over this, the value as found on the AIH scale of the amount bet on the particular horse being considered. For example, if the mutual win pool is 30,000 and the amount bet on the horse under consideration is 20,000, these two values as found on the MPC logarithmic and the ALH scales, respectively, are placed in alignment as shown in FIG. 4 and the amount this horse will pay to win can be seen on the win scale 10 through the win window 17 over the cooperating marker 22 as $2.55. In order to take into account the 15% that must be subtracted for the track take, the win answer scale 10 is offset by 15% with respect to the position it would have taken if 15% did not have to be deducted. If these calculations are made individually, it will be noted that:

$$(30,000) - (15\%)(30,000) = 25,500 - 20,000$$
$$= 5,500 \div 20,000 = 0.275 \times 2 = 0.55 + 2.00 = \$2.55$$

In calculating the amount a horse will pay to show, the same procedure used above in calculating the place position is used except that an additional subtraction will be made on the MP and TW scales to take into account that three rather than two horses will pay money to holders of show tickets; and in order to have the remaining operations performed on the calculator for the show position the same as those made for the place position, the show answer scale 12 is calibrated to automatically take into account that the net amount available for distribution as profit has to be divided into three equal parts rather than two as was the case with the place position.

As stated before, the win, place, and show answer scales represent the amount redeemable for $2 wagers. If, however, it is desirable to determine the amount redeemable for a 5, 10, 50, or 100 dollar ticket, the amount redeemable for a $2 ticket is first found on the MPC logarithmic scale 7 and one of the ticket indicators 30, 31 of the AIH scale is set in alignment therewith. The value of a 5, 10, 50, or 100 dollar ticket is then read on the MPC logarithmic scale 7 under the appropriate ticket maker 32–35.

Suppose for example, a $2 ticket paid $150. To find the amount a $100 ticket would pay, the ticket indicator 31 is placed in the position shown in FIG. 4 in alignment with the value of 150 on the MPC scale 7. The value of a $100 ticket is then found on the MPC scale 7 directly below the $100 ticket marker 35 to be $7,500.

Although the win, place, and show scales are shown in the drawing as separate scales, it is possible, if desired, to combine these into a single scale and in such case a single window with separate win, place, and show markers will be provided. For practical purposes, however, the win scale might not be combined with the place and show scales since the range of the win scale is so much greater than these other two scales. Combining all three of these scales would therefore make it difficult to read with the desired accuracy the answers for place and show.

According to the teachings of the present invention, it is also possile to calculate the odds on a particular horse to win. This is accomplished by the specific positioning of the odds answer scale 9 with respect to the win answer scale whereby with any value on the win scale, the particular odds that amount represents may be read directly on the odds scale. As shown in FIG. 4, for example, a horse that will pay $2.55 to win will have odds of a little better than 1 to 5 as shown on the odds scale.

Figure 8:
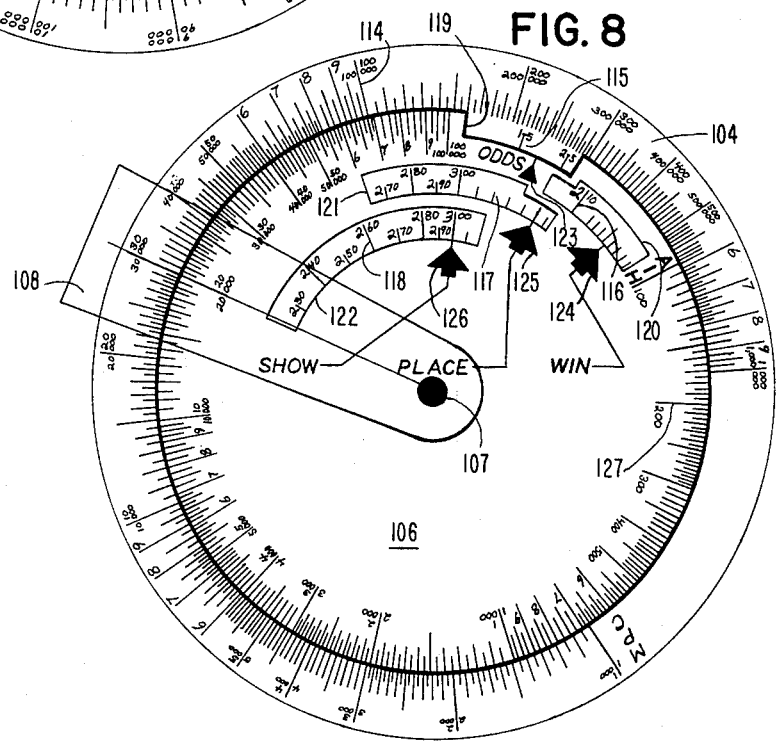
FIG. 8 is a plan view of the modified form of the invention showing the opposite side thereof.
Figure 9:
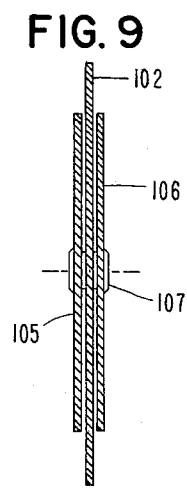
FIG. 9 is a cross-sectional view on a reduced scale of the calculator shown in FIGS. 7 and 8.

A different embodiment of the invention is shown in FIGS. 7–9. Here the base member comprises a disc 102 having two sides or faces 103 and 104.

Cooperating with this base member are two circular slide members or discs 105 and 106 superimposed over the faces 103 and 104, respectively. As shown, these slide members are rotatably secured to the base member by the pin 107 and are of a smaller diameter than the base member. Also rotatably mounted about the pin 107 is the cursor 108 having a hairline 129. Along the outer edge of face 103 of the base member 102 is placed an MP scale 109 calibrated in the same manner as the MP scale 6 on the calculator shown in FIGS. 1–6. Cooperating with this MP scale is the TW scale 110 on the outer edge of the slide member 105. The outer edge of the slide member 105 is also provided with a window 111 designated the MPC window. This window has a cooperating marker 112 and as shown in FIG. 7 this window and marker overlie another scale 113 on the base member 102. This scale, concentrically disposed with respect to the MP scale 109, is the MPC arithmetic scale functioning in the same way as the MPC arithmetic scale 8 shown in FIG. 1 and is used for reading answers to calculations made on the MP and TW scales 109 and 110, respectively.

Along the outer edge of the other face 104 of the base member 102 is placed the MPC logarithmic scale 114. Concentrically disposed with respect to this scale on the face 104 are the odds answer scale 115, the win answer scale 116, the place answer scale 117, and the show answer scale 118. As shown in FIG. 8, these scales, although concentrically disposed, are placed at different distances from the center of the base member 102. The slide member 106 overlying the face 104 of the base member 102 covers all the scales on the face 104 except the MPC logarithmic scale 114. In order to read these covered scales, windows 119–122 are provided with each of the windows overlying one of the scales 115–118, and these windows are, in turn, provided with cooperating markers 123–126, respectively. As with the form of the calculator shown in FIGS. 1–6, these windows are designated as the odds, win, place, and show windows. Finally, the slide member 106 is provided with scale 127. This scale is the same as scale 14 shown in FIG. 1 and is likewise designated the AIH scale. Each of the scales shown on the calculator of FIGS. 7–9 is the same as the corresponding scale on the calculator of FIGS. 1–6; however, the upper limits of these scales are not necessarily the same as those on the scales of FIGS. 1–6. This has been done for purposes of illustration to show that these higher values may be provided if desired.

Calculations are made on the form of the calculator shown in FIGS. 1–7 in substantially the same manner as with the calculator of FIGS. 1–6. The necessary subtractions are made with the MP and TW scales on the face 103 and the slide member 105. Answers are read out on the MPC arithmetic scale 113; and the calculator is then turned over and the remaining calculations made with the MPC logarithmic scale 114 and the AIH scale 127.

While the invention has been described with reference to certain specific forms of the calculator, it is to be understood that various modifications may be made without departing from the scope of the invention as set forth in the following claim.

I claim:

A calculator for determining the minimum amount a race horse will pay per wager in the pari-mutuel system of wagering on the different winning positions comprising:

(a) a base member having two elongated edges spaced apart by a predetermined distance, (b) an arithmetic mutual pool scale adjacent one of said elongated edges and having indicia thereon representing the amount wagered on said different positions, (c) a first mutual pool correction scale disposed between said elongated edges and having indicia thereon representing the profit available for distribution, said correction scale being an arithmetic scale, (d) a second mutual pool correction scale adjacent said other elongated edge and having indicia thereon representing the profit available for distribution, said second correction scale with the increments thereof divided into three equal scale segments from one end of said edge to the other and with said indicia ranging in sequential order from a low to a high value with the lowest value positioned in said first scale segment at one extreme thereof adjacent said one end being a logarithmic scale, (e) an elongated slide member mounted for longitudinal movement on said base member between said elongated edges, (f) a total wager arithmetic scale disposed on said slide member and oriented with respect to said mutual pool scale for cooperating therewith in performing subtractions of numbers, (g) a mutual pool correction answer window located on said slide member directly over said first correction scale, (h) a marker on said slide member adjacent said window cooperating with said first correction scale for indicating answers to subtractions performed on said mutual pool and total wager scales, (i) said mutual pool scale being divided into increments smaller by a fixed percentage than the increments on said total wager and first correction scales whereby answers shown on said first correction scale will be reduced by a fixed percentage representing the track take, (j) a logarithmic scale disposed on said slide member and oriented with respect to said second correction scale for cooperating therewith in performing divisions of numbers with the increments thereof divided into three equal scale segments from the end of said slide member disposed adjacent said one end of the base member to the other and with said indicia ranging in sequential order from a low to a high value with the lowest value positioned in said second scale segment at the end thereof adjacent said one end, (k) separate win, place and show answer scales disposed on said base member between said elongated edges, (l) indicia positioned on said win answer scale representing answers to divisions performed on said second correction scale and cooperating scale reduced by a fixed percentage representing the track take, multiplied by an amount equal to the wager and increased by an amount equal to the wager, (m) indicia positioned on said place answer scale representing answers to divisions performed on said second correction scale and cooperating scale multiplied by an amount equal to one-half the wager and increased by an amount equal to the wager, (n) indicia positioned on said show answer scale representing answers to divisions performed on said second correction scale and cooperating scale multiplied by an amount equal to one-third the wager and increased by an amount equal to the wager,
(o) an answer window for each answer scale located on said slide member directly over the corresponding scale,
(p) an answer marker on said slide member adjacent each window cooperating with the corresponding answer scale for indicating the minimum amount payable per wager,
(q) an odds scale positioned on said base member, and
(r) an odds marker positioned on said slide member and oriented with respect to the win answer marker whereby the odds on an entry to win will be shown with each corresponding answer on the win answer scale for said entry.

References Cited by the Examiner

UNITED STATES PATENTS

| | | | |
|---|---|---|---|
| 896,002 | 8/1908 | Free | 235—88 |
| 1,429,463 | 9/1922 | Squyer | 235—88 |
| 2,612,317 | 9/1952 | Houtte et al. | 235—85 |

FOREIGN PATENTS

| | | |
|---|---|---|
| 84,386 | 10/1957 | Denmark. |
| 169,667 | 12/1951 | Germany. |
| 203,862 | 9/1923 | Great Britain. |
| 591,170 | 4/1959 | Italy. |
| 35,115 | 4/1935 | Netherlands. |

LEO SMILOW, *Primary Examiner.*
LEYLAND M. MARTIN, *Examiner.*